July 15, 1958 I. J. P. JAMES 2,843,659

COLOR TELEVISION APPARATUS

Filed Sept. 14, 1954

INVENTOR
I. J. P. James
BY
ATTORNEYS

United States Patent Office 2,843,659

Patented July 15, 1958

2,843,659

COLOR TELEVISION APPARATUS

Ivanhoe John Penfound James, South Ealing, London, England, assignor to Electric & Musical Industries Limited, Hayes, Middlesex, England, a British company Application September 14, 1954, Serial No. 455,975

Claims priority, application Great Britain September 19, 1953

5 Claims. (Cl. 178—5.4)

Figures 1, 2, 3:
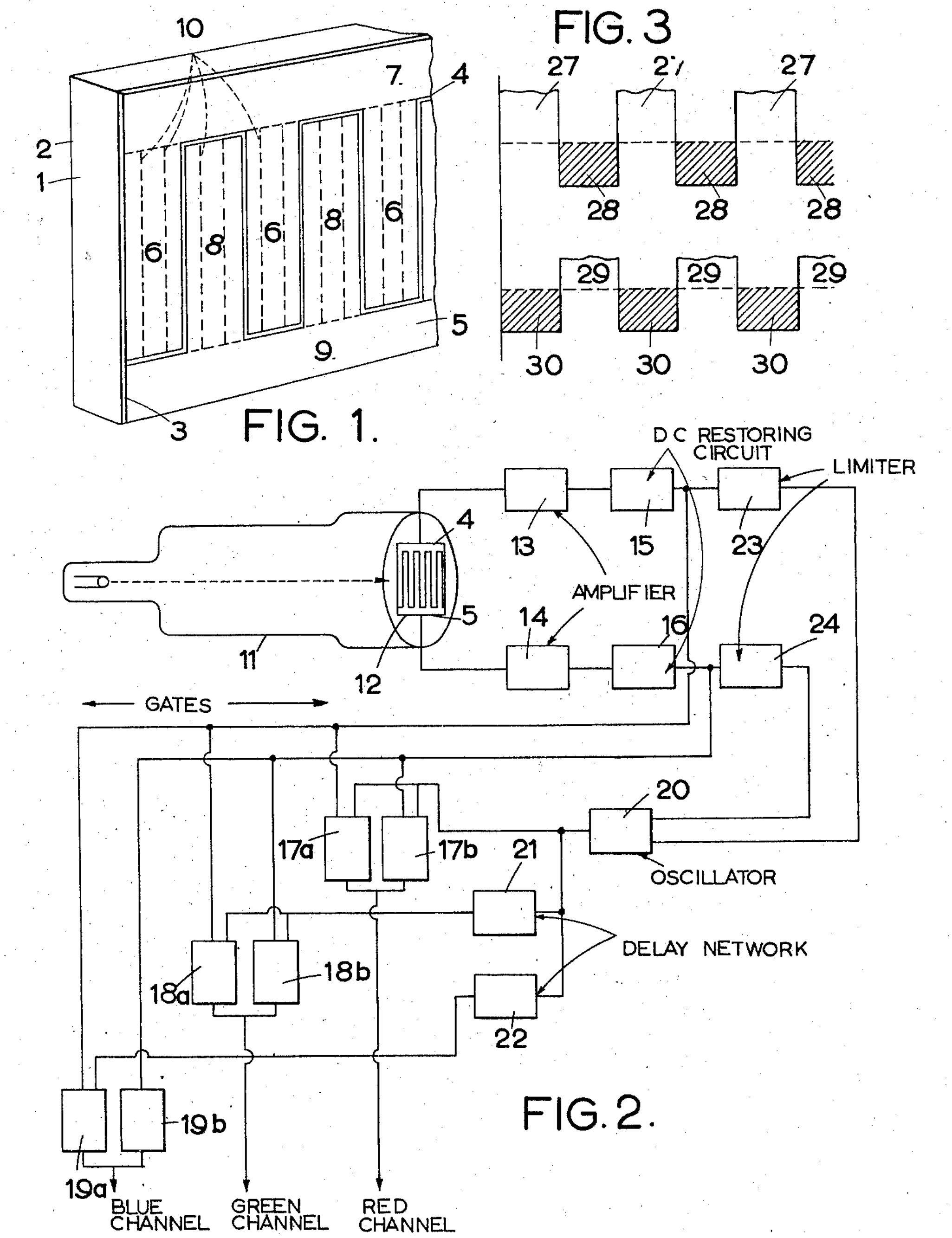

This invention relates to colour television apparatus. In the specification of United States patent application Serial No. 262,361, which has issued as Patent No. 2,738,379, colour television apparatus is described comprising a television pick-up tube having a colour filter composed of parallel strips of differently coloured elements disposed to filter light passing to the target of the pick-up tube. The strips of the colour filter are arranged with their length substantially perpendicular to the direction of the line scanning in the pick-up tube and the arrangement is such that the signal output derived from the tube during each line scanning traversal comprises successive groups of colour signal elements, each group for example consisting of a red colour element, a green colour element, and a blue colour element.

In the operation of tubes of this construction it is usual to gate the signal elements corresponding to different colours into different signal channels and one difficulty which is encountered is that of ensuring correct channel selection since, although the strips of the colour filter be arranged in regular sections, the generated signal elements may be irregular in their timing due to non-linearity in the scanning, that is the variations in the scanning rate. In the aforesaid specification it is proposed to reduce this difficulty by providing the colour filter with an opaque strip between each group of three coloured strips and continuously illuminating the target by means of a biassing light of such a nature that an additional signal element is produced corresponding to the opaque strip between each group of colour elements, said additional signal element being confined to a separate amplitude range from the colour elements. The additional signal element is then employed for controlling the gating of the colour signal elements into their appropriate channels.

The present invention is an improvement in or modification of the colour television apparatus claimed in the aforesaid specification, and has the object of removing the need of an opaque strip in the colour filter, whilst at the same time enabling the colour elements to have a common amplitude range.

Another object of the present invention is to derive groups of signal elements as in the aforesaid specification alternately from conductors connected alternately to a plurality of parallel strip electrodes capacitively associated with the target so that said groups of signal elements may be separated under the control of interruptions in the signals derived from said conductors.

In order that the invention may be clearly understood and readily carried into effect, the invention will be described with reference to the accompanying drawings, in which:

Figure 1 illustrates a fragment of the target of a pick-up tube intended for use in apparatus according to one example of the present invention, Figure 2 illustrates in block form part of one example of colour television apparatus according to the present invention, and Figure 3 comprises waveform diagrams explanatory of the operation of Figures 1 and 2.

The target shown in Figure 1 will be assumed to form part of a pick-up tube 11 which is employed in the apparatus illustrated in Figure 2. The target denoted in general by the reference 12 comprises a sheet of dielectric material 1, for example of glass, having a mosaic screen in the form of a multiplicity of discrete photosensitive elements applied to the surface 2 of the dielectric sheet 1 and having two mutually insulated and intermeshing signal output electrodes applied to the opposite surface 3 of the sheet 1 each in the form of a thin transparent film of conductive material. The electrode 4 consists of vertical strips 6 connected together by a transverse strip 7 and the electrode 5 similarly consists of vertical strips 8 intermeshing with the strips 6 and connected together by a transverse strip 9. The strips 6 and 8 extend at right angles to the direction of line scanning in the pick-up tube. The target 12 is provided with a filter consisting of parallel strips of differently coloured elements disposed so as to filter light passing to the mosaic screen on the surface 2. The strips of the filter are parallel to the strips 6 and 8 of the output electrodes and each strip 6 and 8 has the width of three of the elements of the filter so that each strip 6 or 8 corresponds to a group of three filter elements coloured respectively, red, green and blue. Preferably, the filter elements are formed on the strips 6 and 8 as represented by the dotted lines 10 in Figure 1. In this case the filter elements may be in the form of metal films which have the desired colour by virtue of interference effects.

In Figure 2 the pick-up tube 11 in which the target 12 is mounted is indicated only in outline. The tube may be of any suitable construction, but is preferably of the low velocity type such as described, for example, in the Journal of the Institution of Electrical Engineers, volume 97, part III, No. 50, pages 383 et sequi. The electrode 4 of the target 12 is coupled to an amplifier 13 whilst the electrode 5 is coupled to a separate amplifier 14. The outputs of the amplifiers 13 and 14 are applied via D. C. restoring circuits 15 and 16 to a series of gates *17a*, *17b*, *18a*, *18b*, *19a* and *19b*. As shown the gates are arranged in pairs and the output derived from the electrode 4 is applied in parallel to the gates *17a*, *18a* and *19a* whilst the output derived electrode 5 is applied in parallel to the gates *17b*, *18b* and *19b*. The outputs of the gates *17a* and *17b* are combined in a signal channel which constitutes the "red" channel of the colour television apparatus. Similarly the outputs of the gates *18a*, *18b* and *19a*, *19b* are combined in the "green" and "blue" channels of the apparatus. The gates are normally closed but are opened sequentially in cyclic order by pulses derived from an oscillator 20 or synchronised by keying pulses, as will hereinafter appear. The oscillator 20 may be a square wave oscillator or a sine wave oscillator. Pulses from the oscillator 20 are applied directly to the gates *17a*, *17b*, are applied to the gates *18a*, *18b* through a delay network 21 and are applied to the gates *19a* and *19b* through a delay network 22. To control the rate of generation of the pulses to the oscillator 20 in dependence upon the scanning rate in the pick-up tube 11, the outputs from the D. C. restoring circuits 13 and 14 are applied not only to the aforesaid gates but to limiters 23 and 24 and thence to the oscillator 20.

When the apparatus described is operated, the mosaic screen is continuously illuminated through the colour filter consisting of the elements 10 by a biassing light of white colour. The image to be televised is also projected on the mosaic screen through the aforesaid filter and by virtue of the biassing light, signals derived from the output electrodes 4 and 5 and corresponding to the image are elevated so that their "black level" corresponds to the intensity of the biassing light. The signals fed to the amplifier 13 from the electrode 4 can therefore be regarded as consisting of alternate groups of colour signal elements 27 of positive polarity and keying pulses 28 of negative polarity, each group 27 consisting of a red signal element, a green signal element, and a blue signal element. The pulses 28 correspond to interruptions in the output from the electrode 4. Similarly, the signals applied to the amplifier 14 from the electrode 5 can be regarded as consisting of alternate groups of colour elements 29 and keying pulses 30 and by reason of the intermeshing of the electrodes 4 and 5, each group of signal elements 27 coincides with one of the pulses 30. Similarly each group of signal elements 29 coincides with one of the pulses 28. The separate signal outputs of the amplifiers are applied to the D. C. restoring circuits 13 and 14 and thence to the limiters 23 and 24 to remove the colour signal elements leaving the keying pulses 28 and 30 which can then be used to control the frequency of the oscillator 20 and thus, as described in the aforesaid specification, to control the gates for admitting the colour signal elements to the appropriate colour channels, in synchronism, with the generation of the respective elements. It will be appreciated that even when scanning portions of the light image representing black, the generation of the keying signals will not be interfered with.

The oscillator 20 shown in Figure 2 may in some cases be omitted and the gates operated directly by the keying pulses 28 and 30 after passing the pulses through a pulse shortening circuit. In the case of the green and blue channels the delay networks can be arranged to produce the pulse shortening.

Instead of providing the colour filter elements on the strips 6 and 8, an image of the colour filter may be projected on the output electrodes, in which case care must be taken to register the elements of the filter correctly on the corresponding strips 6 and 8. The elements of the colour filter may also be of different widths, for example, the green strips may be wider than red or blue strips. Alternatively, the filter may only comprise red and blue strips in which case the green components of the picture are obtained from a separate pick-up tube. This tube may be arranged to produce signals representing only green components or may be arranged to produce luminance signals from which the green component can be derived by subtracting the red and blue signals in known manner.

Instead of using light to bias the picture signal elements and produce the keying signals 28 and 30, the sheet 1 of the target can be made slightly conductive and a positive bias potential (relative to cathode potential) applied to the electrodes 4 and 5, the conductivity of the sheet 1 being predetermined so that the mosaic elements can charge, by leakage through the sheet 1, to the level of the bias in the intervals between successive scans. In this way a shift of true black level is obtained. The bias may only be applied to the output from one electrode, and the oscillator synchronised only by interruptions in the output from one electrode.

What I claim is:

1. Colour television apparatus comprising an image pick-up tube having a target, a plurality of parallel strip electrodes capacitively associated with said target and extending transverse to the direction of scanning of said target, two conductors connected alternately to said strip electrodes for deriving alternately signals representing portions of a light image projected on said target, a multi-element colour filter for filtering said light image before projection on said target to cause each image portion to consist of a group of colour elements, a plurality of output circuits, and separating means for selectively connecting said conductors to said output circuits, under the control of the interruptions in the signals derived by said conductors thereby to separate signals representing elements of different colours.

2. Apparatus according to claim 1 wherein said separating means comprises a plurality of gates one connected from each conductor to each output circuit, means for deriving synchronising signals in response to said interruptions, and means for generating gating pulses timed by said synchronising signals.

3. Apparatus according to claim 1 said colour filter comprising elements of only two component colours, and comprising a second pick-up tube for the derivation of signals representing said image and of higher definition than the signals derived from said first pick-up tube.

4. Colour television apparatus comprising an image pick-up tube having a charge storage target, a plurality of parallel strip electrodes capacitively associated with said target and extending transverse to the direction of scanning of said target, two conductors connected alternately to said strip electrodes for deriving alternately signals representing portions of a light image projected on said target, a colour filter consisting of groups of filter strips of different colours parallel to said strip electrodes for filtering said light image before projection on said target, each group registering with one of said strip electrodes, to cause each image portion to consist of a group of colour signal elements, a plurality of output circuits, and separating means for selectively connecting said conductors to said output circuits under the control of the interruptions in the signals derived by said conductors thereby to separate signals representing elements of different colours.

5. Apparatus according to claim 1 comprising means for continuously illuminating said target through said colour filter with a white light to cause said interruptions in the signals to have a more negative potential than any signal representative of a colour element.

References Cited in the file of this patent

UNITED STATES PATENTS 2,681,381 Creamer ---------------- June 15, 1954